(12) United States Patent
Shao et al.

(10) Patent No.: US 9,667,442 B2
(45) Date of Patent: May 30, 2017

(54) TAG-BASED INTERFACE BETWEEN A SWITCHING DEVICE AND SERVERS FOR USE IN FRAME PROCESSING AND FORWARDING

(75) Inventors: Bill Shao, Pleasanton, CA (US); Cynthia Ann Gabriel, Gilroy, CA (US); Tienwei Chao, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 705 days.

(21) Appl. No.: 12/902,703

(22) Filed: Oct. 12, 2010

(65) Prior Publication Data

US 2011/0026527 A1    Feb. 3, 2011

Related U.S. Application Data

(63) Continuation-in-part of application No. 12/664,060, filed as application No. PCT/US2008/066468 on Jun. 11, 2008, now Pat. No. 8,559,429.
(Continued)

(51) Int. Cl.
*H04L 12/46* (2006.01)
*H04L 12/931* (2013.01)

(52) U.S. Cl.
CPC ........ *H04L 12/4666* (2013.01); *H04L 49/354* (2013.01)

(58) Field of Classification Search
CPC ..... H04L 12/5689; H04L 45/00; H04L 49/20; H04L 49/253; H04L 49/351;
(Continued)

(56) References Cited

U.S. PATENT DOCUMENTS 6,377,998 B2   4/2002   Noll et al.
6,553,030 B2   4/2003   Ku et al.
(Continued)

OTHER PUBLICATIONS

Cisco Systems, The Global Server Load Balancing Primer, White Paper by Cisco Sytems, 2004, pp. 4-8.*
(Continued)

*Primary Examiner* — Edan Orgad
*Assistant Examiner* — Jeremy Costin
(74) *Attorney, Agent, or Firm* — Schmeiser, Olsen & Watts LLP

(57) ABSTRACT

A data center includes a blade server rack with a switch device in communication with a plurality of servers. To process a frame, the switch device determines, from content in a frame header by the switch device, a port through which to forward the frame to a server. The switch device inserts a value into a particular field, for example, a VLAN (virtual Local Area Network) tag, in the frame header before forwarding the frame. The server performs a specific action related to processing the frame based on the value inserted by the switch device into the particular field in the frame header. The server can modify the value in the particular field of the frame header before returning the frame to the switch device, with the switch device performing a specific action based on the value in the particular field of the frame header as modified by the server.

18 Claims, 7 Drawing Sheets

Related U.S. Application Data

(60) Provisional application No. 60/943,290, filed on Jun. 11, 2007.

(58) Field of Classification Search
CPC ............... H04L 49/3009; H04L 49/309; H04L 63/02–63/029; H04L 63/14; H04L 63/1408; H04L 63/16; H04L 12/4666
USPC ....... 370/389, 392, 397, 395.3, 395.31, 409, 370/410, 428, 399; 709/229, 232; 726/11–15, 23, 24
See application file for complete search history.

(56) References Cited

U.S. PATENT DOCUMENTS

| | | | |
|---|---|---|---|
| 6,697,368 | B2 | 2/2004 | Chang et al. |
| 6,735,198 | B1 | 5/2004 | Edsall et al. |
| 7,194,550 | B1 | 3/2007 | Chamdani et al. |
| 7,240,364 | B1 | 7/2007 | Branscomb et al. |
| 7,266,598 | B2 | 9/2007 | Rolia et al. |
| 7,821,925 | B2 | 10/2010 | Davies |
| 7,953,074 | B2 | 5/2011 | Pettey et al. |
| 7,978,690 | B2 | 7/2011 | Abel et al. |
| 8,160,082 | B2 | 4/2012 | Harris et al. |
| 2003/0074467 | A1* | 4/2003 | Oblak et al. .................. 709/238 |
| 2004/0098499 | A1 | 5/2004 | Tamai |
| 2005/0111455 | A1* | 5/2005 | Nozue et al. .................. 370/392 |
| 2005/0182815 | A1 | 8/2005 | Offredo et al. |
| 2006/0080446 | A1 | 4/2006 | Bahl |
| 2006/0095960 | A1 | 5/2006 | Arregoces et al. |
| 2007/0180113 | A1* | 8/2007 | Van Bemmel ................ 709/226 |
| 2008/0002579 | A1* | 1/2008 | Lindholm et al. ............. 370/230 |
| 2008/0163372 | A1* | 7/2008 | Wang ............................. 726/24 |
| 2008/0177896 | A1* | 7/2008 | Quinn et al. .................. 709/238 |

OTHER PUBLICATIONS

Sumeet Singh et al., Service Portability, Record of the 5th Workshop on Hot Topics, Hot Nets V, Irvine, CA, Nov. 29-30, 2006, pp. 49-54.*

Non-Final Office Action in related U.S. Appl. No. 12/741,225, mailed May 3, 2012; 14 pages.

Fulcrum Microsystems, Load Distribution in Telecom Servers Using FocalPoint Reduces System Cost and Improves System Flexibility, Jul. 2008, 7 pages.

James Radley, Load Balancing Between Server Blades Within Atca Platforms, Oct. 2007, 4 pages.

Cisco Systems, Inc., Cisco Data Center Infrastructure 2.5 Design Guide, Dec. 6, 2007, 180 pages.

Non-Final Office Action in related U.S. Appl. No. 12/664,060, mailed Sep. 13, 2012; 17 pages.

Final Office Action in related U.S. Appl. No. 12/741,225, mailed on Oct. 29, 2012; 14 pages.

Notice of Allowance and Fee(s) Due in related U.S. Appl. No. 12/664,060, mailed on Jun. 12, 2013; 15 pages.

Notice of Allowance and Fee(s) Due in related U.S. Appl. No. 12/741,225, mailed on May 29, 2013; 10 pages.

Non-final Office Action in related U.S. Appl. No. 12/900,579, mailed on Sep. 18, 2013; 13 pages.

Final Office Action in related U.S. Appl. No. 12/664,060, mailed on Mar. 18, 2013; 26 pages.

Final Office Action in related U.S. Appl. No. 12/900,579, mailed on Apr. 17, 2014; 14 pages.

Notice of Allowance in related U.S. Appl. No. 12/900,579, mailed on Jun. 11, 2014; 5 pages.

* cited by examiner

TAG-BASED INTERFACE BETWEEN A SWITCHING DEVICE AND SERVERS FOR USE IN FRAME PROCESSING AND FORWARDING

RELATED APPLICATION

This application is continuation-in-part of U.S. patent application Ser. No. 12/664,060, filed Dec. 11, 2009, which is a national stage entry of PCT application no. PCT/US2008/066468, filed Jun. 11, 2008, which claims priority from U.S. provisional application No. 60/943,290, filed on Jun. 11, 2007, the entireties of which applications are incorporated by reference herein.

FIELD OF THE INVENTION

The invention relates generally to data centers. More particularly, the invention relates to techniques for managing traffic flow among servers in a data center.

BACKGROUND

Most organizations have a data center for running those applications that handle the core business and operational data of the organization. Also referred to as a server room, computer closet, or network operations center, a data center has various computing resources that support the basic intranet and Internet services needed by users within the organization, such as email servers, proxy servers, and DNS servers. In addition, data centers typically deploy network security components, such as firewalls, VPN (virtual private network) gateways, and intrusion detection systems.

In traditional networking, routers and switch devices usually refer to a MAC (Media Access Control) address, to a VLAN (Virtual Local Area Network) identifier, or to zoning information within a given frame to forward that frame. This forwarding behavior limits addressing to one other system (i.e. the next hop in the path toward the frame's destination). In a data center environment, such frame forwarding behavior can impact performance.

FIG. 1 illustrates frame forwarding behavior in a conventional data center environment 10 having a switch device 12 connected through a first port 14-1 to a first computing system 16 (here, called an initiating system), through a second port 14-2 to a second computing system 18, and through a third port 14-N to a third computing system 20. Consider that the initiating system has a frame that is to be processed by the second and third computing systems. The initiating system 16 sends (step 1) a frame to the switch device 12 over link 22. The switch device 12 forwards (step 2) the frame through the second port 14-2 to the second computing system 18 over link 24. After the second computing system completes its processing of the frame, the frame returns (step 3) to the switch device 12 through the second port 14-2 over link 24. The switch device 12 then returns (step 4) the frame to the initiating system 16 through the first port 14-1 over link 22.

On receiving the frame from the switch device 12, the initiating system 16 sends (step 5) the frame back to the switch device 12 over link 22, this time for processing by the third computing system 20. The switch device 12 forwards (step 6) the frame to the third computing system 20 through the third port 14-N over link 26. The third computing system 20 completes its processing of the frame and returns (step 7) the frame to the switch device 12 over link 26. The switch device 12 then returns (step 8) the frame to the initiating system 16 over link 22.

A disadvantage of such frame forwarding is the amount of frame traffic traversing the link 22 between the initiating system 16 and the switch device 12. In this simple illustration, this link 22 handles twice the traffic load of that handled by each of the other links 24, 26 to the other computing systems 18, 20. This traffic load multiplies with each additional computing system involved the frame processing sequence. Accordingly, for many types of data center transactions, the link can become a bottleneck on performance.

SUMMARY

In one aspect, the invention features a method of processing a frame in a data center including a blade server rack with a switch device in communication with a plurality of servers. The method comprises determining, by the switch device, from content in a header of a frame received by the switch device, a port of the switch through which to forward the frame to a given server of the plurality of servers. The switch device inserts a value into a particular field in the header of the frame before forwarding the frame through the port to a server of the plurality of servers. The server of the plurality of servers performs a specific action related to processing the frame based on the value inserted into the particular field in the header of the frame by the switch device.

In another aspect, the invention features a switch device comprising a plurality of ports, a frame forwarder with logic configured to switch frames between the ports, and a frame processor with logic configured to determine from content in a header of a received frame one of the ports through which to forward the frame and a policy for processing the frame. The frame processor further comprises logic configured to insert a value into a particular field of the header of the frame before the frame forwarder forwards the frame through the port. The value inserted into the particular field of the header communicates to a recipient device of the frame the policy for processing the frame.

In another aspect, the invention features a blade server rack comprising a plurality of servers and a switch device having a plurality of ports. The switch device is physically connected to a first one of the servers through one of the ports and to a second one of the servers through another of the ports. The switch device further comprises a frame forwarder with logic configured to switch frames between the ports and a frame processor with logic configured to determine from content in a header of a received frame which one of the ports through which to forward the frame and a policy for processing the frame. The frame processor further comprises logic configured to insert a value into a particular field of the header of the frame before the frame forwarder forwards the frame through the port determined for forwarding the frame. The value inserted into the particular field of the header communicates to a recipient device of the frame the policy for processing the frame.

In still another aspect, the invention features a data center comprising a plurality of interconnected blade server racks. Each blade server rack includes a plurality of servers and a switch device having a plurality of ports. The switch device is physically connected to a first one of the servers of that blade server rack through one of the ports and to a second one of the servers of that blade server rack through another of the ports. Each switch device further comprises a frame forwarder with logic configured to switch frames between the ports of that switch device and a frame processor with logic configured to determine from content in a header of a received frame one of the ports of that switch device through which to forward the frame and a policy for processing the frame. The frame processor of each switch device further comprising logic configured to insert a value into a particular field of the header of the frame before the frame forwarder forwards the frame through the port determined for forwarding the frame. The value inserted into the particular field of the header communicating to a recipient device of the frame the policy for processing the frame.

In yet another aspect, the invention features a chipset comprised of one or more integrated circuits. The chip set comprises a frame forwarder with logic configured to switch frames between ports of a switch device, and a frame processor with logic configured to determine from content in a header of a received frame a port through which to forward the frame and a policy for processing the frame. The frame processor is further configured to insert a value into a particular field of the header of the frame before the frame forwarder forwards the frame through the port. The value inserted into the particular field of the header communicates to a recipient device of the frame the policy for processing the frame.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Data centers described herein include a switch device or system that handles the frame forwarding sequence for frames requiring processing by multiple computing systems (e.g., servers) in the data center. By having the switch device manage the frame forwarding sequence, instead of the initiating system that sends the original frame, the frame forwarding process avoids having to return the frame to its initiating system after each computing system completes in turn its processing of the frame. By not returning the frame to the initiating system after each computing system performs its function, the frame forwarding process advantageously reduces the traffic on the link between the initiating system and the switch device.

In addition, the switch device and each of the servers (and other devices in the data center) can affect the frame-forwarding processing by communicating with each other through a tag-based interface. In one embodiment, the interface is embodied in a VLAN tag of the frame header of frames handled by the switch device. The switch device can use the VLAN tag by altering the value of an existing VLAN tag in a received frame or insert an outer VLAN tag with a defined value onto the received frame (which may be originally untagged or tagged). A recipient device (e.g., a server, an initiating device, any intermediary device or another switch) will interpret the value in the VLAN tag as an instruction to perform a certain action when processing the frame. Before returning the frame to the switch device, the recipient device can modify the value in the VLAN tag that the switch device will interpret as an instruction to perform a certain action upon return of the frame. Thus, through the VLAN tag, the recipient device is able to influence the switch device's subsequent forwarding of the frame.

Figure 1:
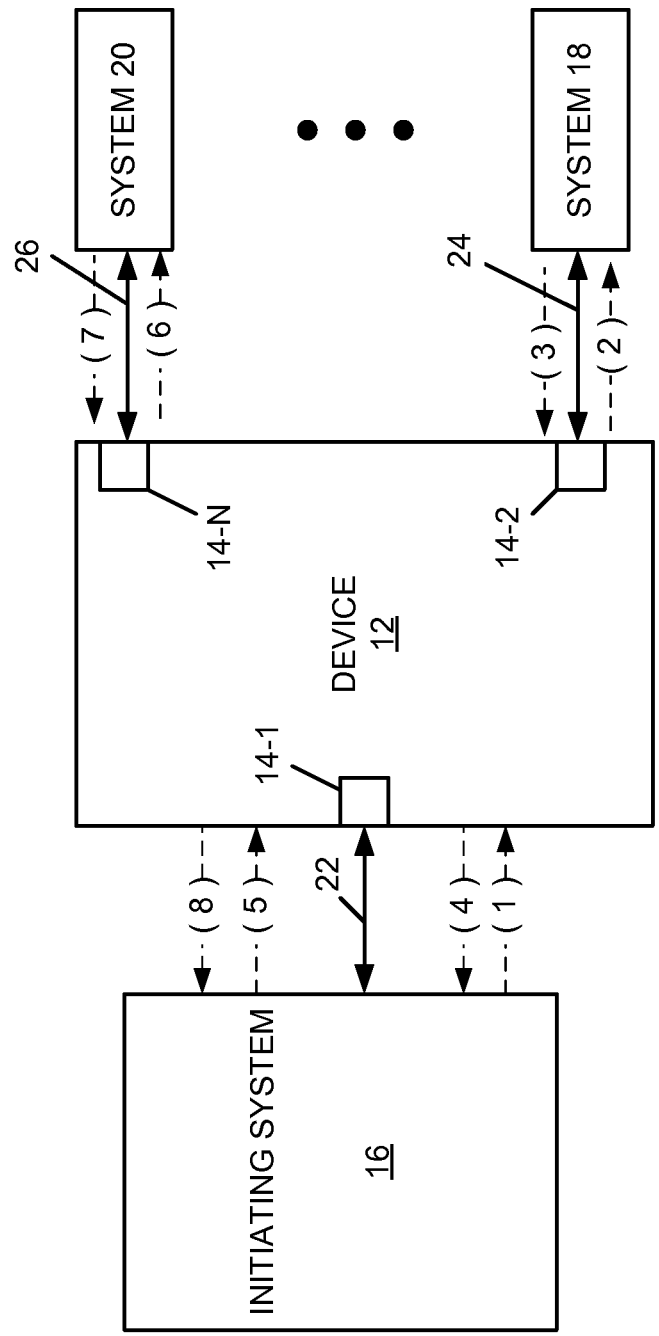
FIG. 1 is an embodiment of a data center environment engaged in traditional sequential frame forwarding behavior.
Figure 2:
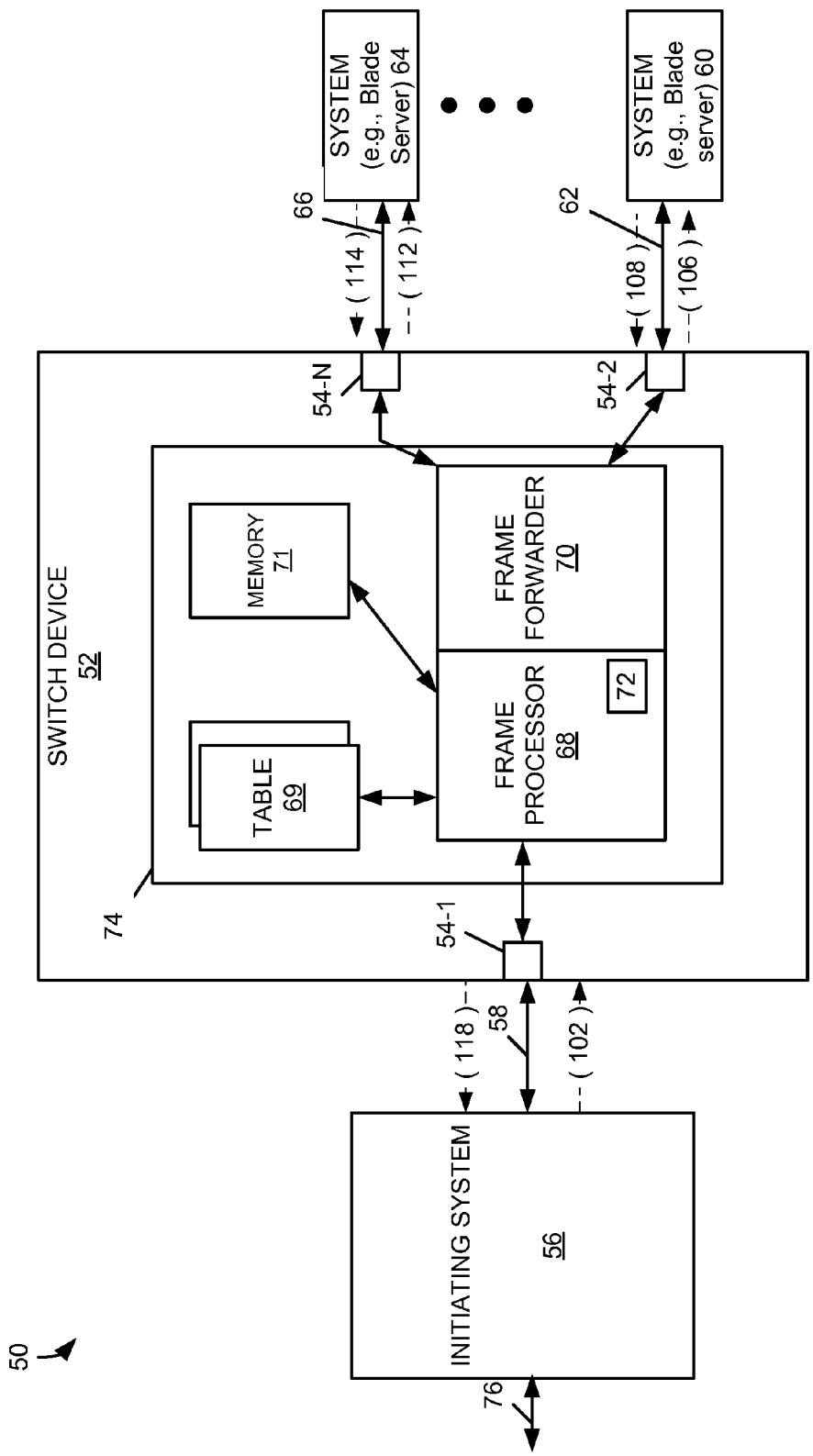
FIG. 2 is a functional block diagram representation of an embodiment of a data center environment engaged in frame forwarding.

FIG. 2 shows an embodiment of a data center environment 50 including a switch device 52 physically connected through port 54-1 to an initiating system 56 over physical link 58, physically connected through port 54-2 to a first computing system (or device) 60 over physical link 62, and physically connected through port 54-N to a second computing system (or device) 64 over physical link 66. The initiating system 56, switch device 52, first and second computing systems 60, 64 can be housed within a single chassis (i.e., rack) or electronics enclosure, within separate chasses (racks), or housed in multiple chasses (racks) in any combination thereof. Further, the switch device 52 and one or more of such computing systems can be housed together within a single unit (i.e., module, box), for example, as integrated components on a circuit board within the unit.

The switch device 52 includes a frame processor 68, one or more tables 69, a frame forwarder 70, memory 71, and the ports 54-1, 54-2, 54-N (generally, 54). The switch device 52 can have more than the number of ports shown. The table 69 comprises a plurality of table entries, each entry mapping a value to a server port, to a set of server ports, to a trunk, or to an application group. For example, when mapping a value to a server port, the switch device is able to perform load balancing by forwarding a frame to an appropriate server for an operation that can be performed by multiple servers in a group, such as virus detection, intrusion detection, firewall, media processing, storage, caching, and others.

As another example, when mapping a value to a set of server ports, the system is able to perform multiple related but independent operations, such as remote backup, activity monitoring, etc. For instance, ports in a group of ports can have a particular role in a financial application; one port may forward frames to a transaction server, while another port connects to a remote backup server, and third port connects to an audit server, a fourth port to a log server, etc. In yet another example, a trunking port is used for either merging traffic from multiple streams of data or splitting the traffic into multiple streams for further processing. For instance, after being subject to a virus detection operation on multiple servers, the traffic needs to be merged and forwarded for further processing within or outside of the data center.

Alternatively, after being received from a high-bandwidth connection, traffic needs to be split and directed to multiple server racks. As an additional example, an application port is used to direct traffic to a server or a group of servers that are dedicated to a certain application, such as video retrieval and caching, audio/video conferencing, financial modeling, and others.

The frame processor 68 includes logic 72 for forwarding frames received by the frame processor 68. The logic 72, which in one embodiment includes one or more filters, may be implemented as hardware, software, or a combination of hardware and software. Implementing the filters in hardware produces faster switching operations than implementations that use software fully or in combination with hardware, with the switching performed by such hardware-based filters approaching the bandwidth of the ports 54. As used herein, a filter is logic that examines specific content in the header of a frame and redirects that frame to a particular port of the switch device 52 based on the header content.

This header content can come from any one or combination of fields in the header, examples of such fields including, but not limited to, source and destination MAC addresses, source and destination IP (Internet Protocol) addresses, source and destination virtual MAC addresses, source and destination virtual IP addresses, a UDP (User Datagram Protocol) port, a TCP (Transmission Control Protocol) port, a VLAN (Virtual Local Area Network) identifier, and a VLAN tag. The particular fields used are selectable by an administrator of the switch device 52. From the select field(s), the logic 72 produces a value that serves as an index into the table 69. As an example, the logic 72 can apply a bit mask to a select field (e.g., a mask that masks out all but the three least significant bits), and uses the resulting value as the index. This index points to one of the table entries, and identifies a port.

The frame forwarder 70 prepares and transmits the frame through the port identified by the logic 72 of the frame processor 68. The memory 71 can be used, for example, to store counts of the number of frames sent to each of the ports 54. The frame processor 68, table(s) 69, memory 71, logic 72, a frame forwarder 70 of the switch device 52 can be implemented as an ASIC (Application Specific Integrated Circuit) component or chip set 74. In one embodiment, the switch device is an Ethernet switch module (e.g., 10 GB, 1 GB, 1/10 GB).

The initiating system 56 is connected to a network (not shown), examples of which include, but are not limited to, the Internet, LAN, WAN (wide area network), and MAN (metropolitan area network). Embodiments of the initiating system 56 include, but are not limited to, an appliance, a switching device, a router, a host, a server, and a special purpose computing system (with or without networking processors). Although only one initiating system 56 is shown, in the data center environment, there may be more than one. In general, the initiating system 56 receives frames from over the network (e.g., over link 76) and submits such frames through the switch device 52 to the computing systems 60, 64 for processing. From the perspective of the data center 50, frames arriving at the switch device 52 from the initiating system 56 are herein said to originate from the initiating system 56, although the actual origin of such frames may reside somewhere else on the network.

Each of the computing systems 60, 64 can be one of a variety of devices or systems including, but not limited to, an application server, a firewall, a database server, an intrusion protection system, an encryption system, a decryption system, a content switch, a file server, and a web server. Servers can be virtual servers or physical servers. In addition, multiple virtual servers can operate on a single physical system. Although only two are shown, the data center environment 50 can have more than the two computing systems 60, 64. In addition, although described herein as being connected to just one computing system, each port 54-2, 54-N of the switch device 52 can be connected to more than one computing system.

In one embodiment, the switch device 52 maintains the policies that govern how incoming frames are to be sequentially processed by the various computing systems. For example, one such policy can be that an incoming frame be examined by a firewall (i.e., a first computing system) and afterwards by an intrusion protection system (i.e., a second computing system). In another embodiment, the policies that govern the sequential handling of frames are embodied by the behavior of the filters executed by the switch device 52. As another example embodiment, a policy defined for a switch port inserts a port identifier into the 12-bit VLAN ID of a VLAN tag, which the switch may add as an outer tag to a frame received on the switch port.

Figure 3:
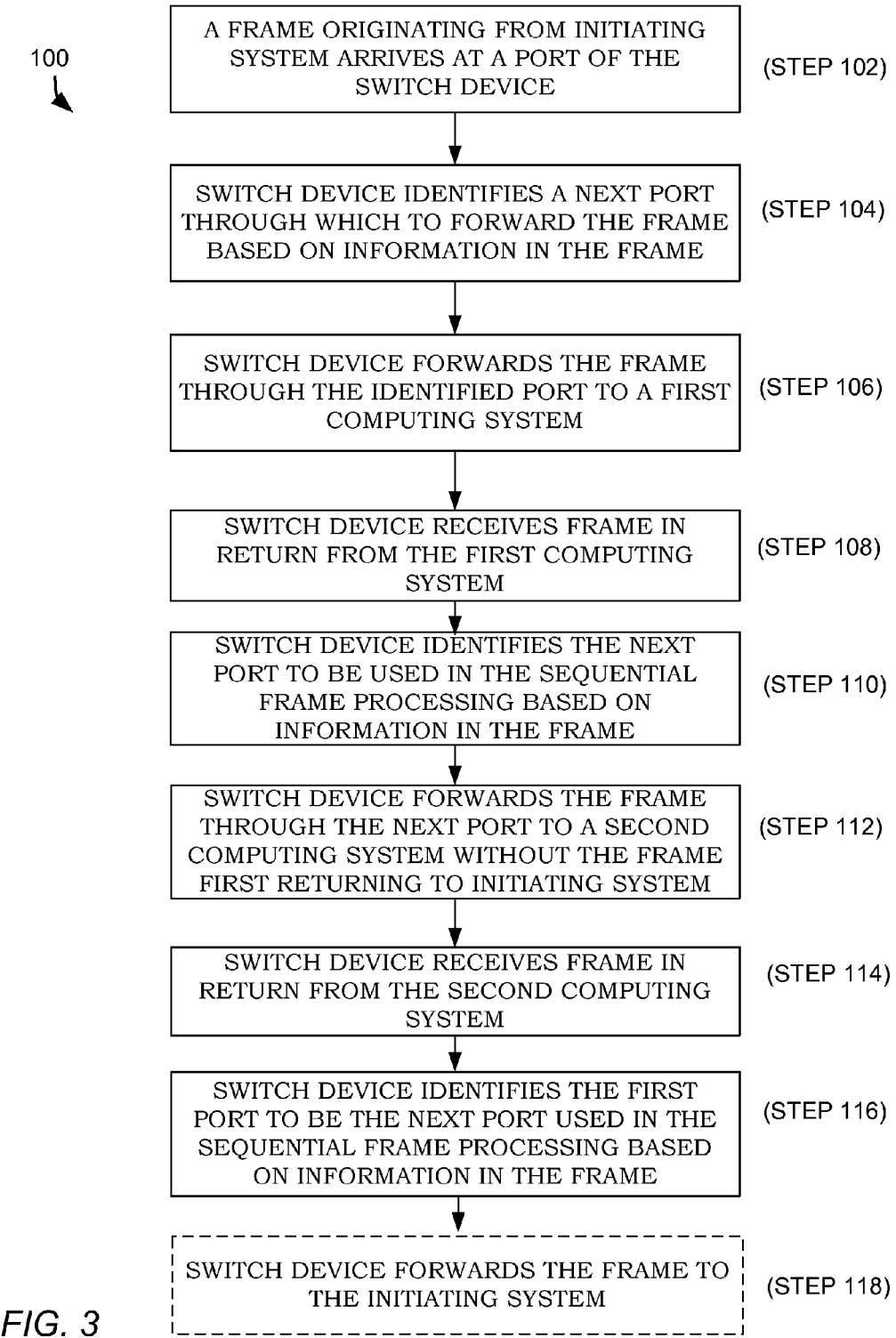
FIG. 3 is a flow diagram of an embodiment of process for performing frame forwarding.

FIG. 3 shows an embodiment of a process 100 for performing frame forwarding. In the description of the process 100, reference is also made to the data center environment 50 of FIG. 2. At step 102, a frame originating from the initiating system 56 arrives at the port 54-1 of the switch device 52. The frame, also referred to as a packet or a protocol data unit (PDU), includes various fields. As examples, the frame can have a source and destination IP (internet protocol) addresses, source and destination MAC addresses, a VLAN identifier, a VLAN tag, or combinations thereof. Consider that the frame is to be processed by the two other computing systems 60, 64 in the data center, and that the order is first the computing system 60, followed by computing system 64.

At step 104, the frame processor 68, under the direction of the logic 72, identifies a port through which to forward the frame. One of a variety of mechanisms can be used to identify this port, examples of which are described in more detail below. In general, the port identification is based on information carried within the frame. The frame forwarder 70 forwards (step 106) the frame through the port 54-2 over the link 62 to the computing system 60. After the computing system 60 completes processing or viewing the frame, the computing system 60 returns (step 108) the frame to the switch device 52 over the link 62.

After the frame arrives at the port 54-2, the frame processor 68 of the switch device 52 identifies (step 110) the next port to be used in the frame processing. The frame forwarder 70 (step 112) sends the frame through the identified port (in this example, to computing system 64 over link 66). After the computing system 64 completes its processing of the frame, the computing system 64 returns (step 114) the frame to the switch device 52 over the link 66. From certain information in the frame, the frame processor 68 identifies (step 116) the next port in the frame processing. In this example, the next port leads to the initiating system 56; accordingly, the frame forwarder 70 forwards (step 118) the frame over the link 58 to the initiating system 56. In some transactions, the frame does not need to be eventually returned to the initiating system.

Forwarding Sequence—Port Identification

Figure 4:
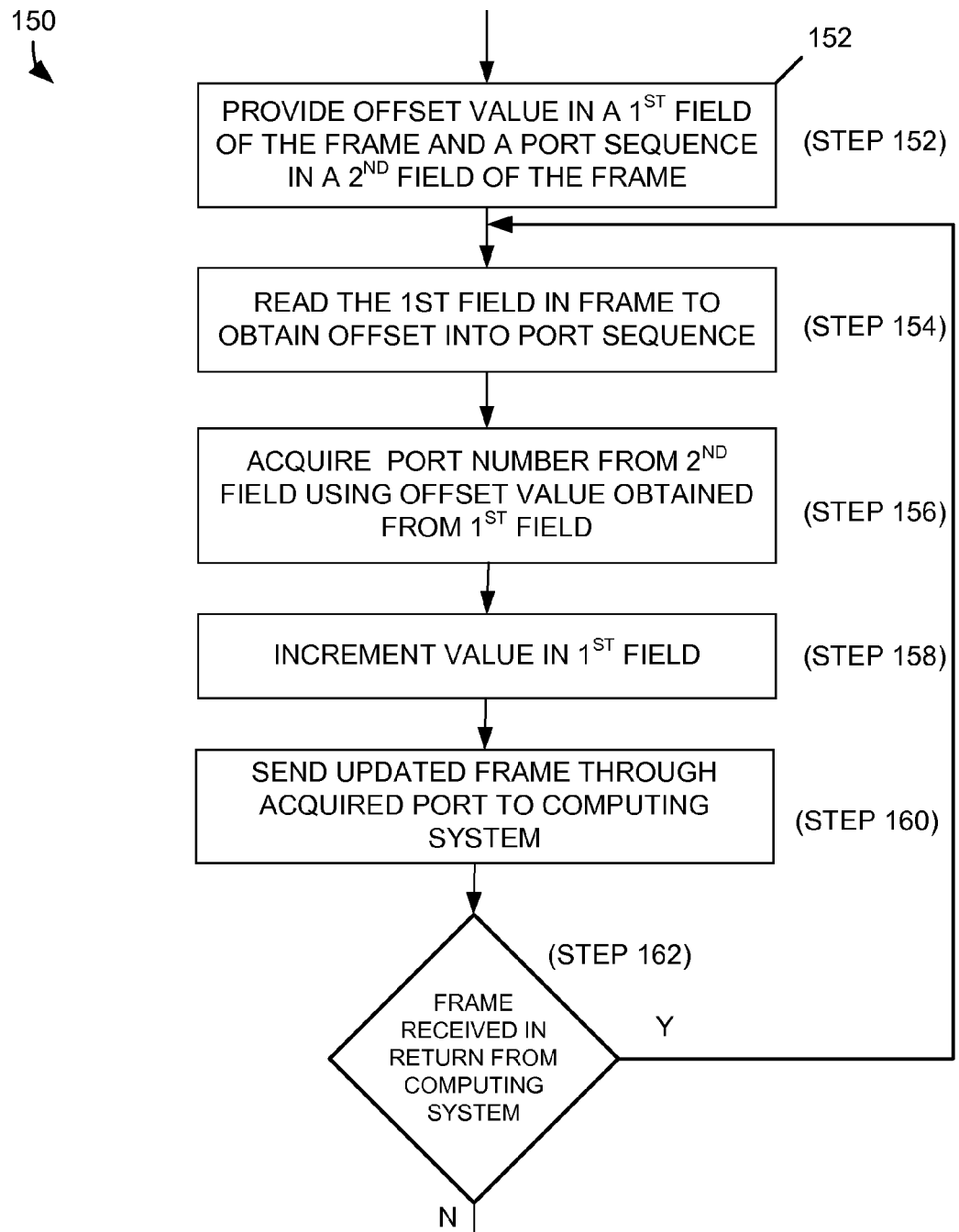
FIG. 4 is a flow diagram of an embodiment of process for identifying ports through which to forward frames during the sequential frame forwarding process of FIG. 3.

FIG. 4 shows an embodiment of a process 150 for identifying the next port to which to forward a frame. In the description of the process 150, reference is also made to FIG. 5A, FIG. 5B, and FIG. 5C, which together show an example of a progression of certain frame contents as the frame moves among the switch device and computing systems. At step 154, the initiating system 56 uses a first field of the frame to hold an offset value and a second field of the frame to hold a forwarding sequence. The forwarding sequence corresponds to the order in which other computing systems 60, 64 of the data center are to sequentially process the frame. The forwarding sequence stored in the second field is a sequence of port numbers. To be able to specify an appropriate forwarding sequence (i.e., port number sequence) for processing a given frame, the initiating system 56 knows, a priori, the port connections between the computing systems of the data center and the particular ports 54 of the switch device. The offset value stored in the first field functions as an offset (i.e., index or pointer) into the second field. In general, the offset value corresponds to the number of times the switch device receives the frame. The switch device uses this number as an offset into the second field from which to extract a port number.

In one embodiment, the frame is an IEEE 802.1q Ethernet frame having a six-byte source MAC address field, a six-byte destination MAC address field, and a VLAN ID field. Either the source MAC address field or the destination MAC address field can be used to store the forwarding sequence, and the VLAN ID field can be used to store the offset value. If the VLAN ID is unavailable for use in storing the offset value (for example, VLANs are deployed in the data center), an external VLAN tag (i.e., Q-in-Q) can be added to the frame to serve as the holder of the offset value. In this embodiment, all computing systems 60, 64 connected to the switch device 52 are configured not to alter the contents of the VLAN ID field (or external VLAN tag) holding the offset value or the MAC address field holding the forwarding sequence (thus, preserving the original value. In another embodiment, such as that described below in connection with FIG. 8, the computing systems 60, 64 are configured to alter the contents of the VLAN ID field (or external VLAN tag), thus, permitting changes to the original value. Although described herein with reference to Ethernet frame formats, the principles extend to other types of frame formats (e.g., Fibre Channel).

Figure 5A:
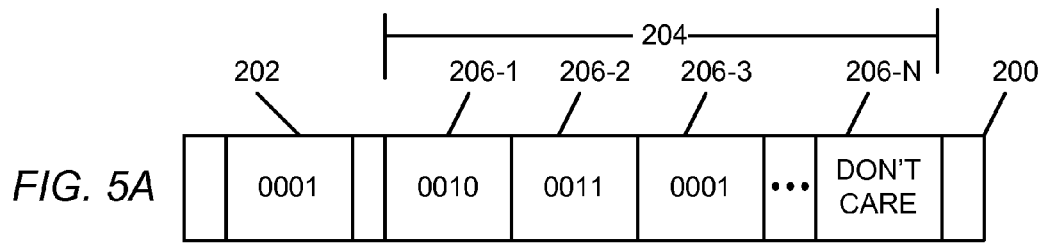
FIG. 5A, FIG. 5B, and FIG. 5C illustrate the content of certain fields of a frame as the frame moves among the switch device and computing systems of the data center environment.

When the frame arrives from the initiating system, the switch device extracts (step 154) the offset value stored in the first field and acquires (step 156) the next (i.e., egress) port from the second field. FIG. 5A shows an example embodiment of a frame 200 having a first field 202 and a second field 204. The location of the first field 202 relative to the second field 204 within the frame 200 as shown is merely for illustration purposes; the actual location of such fields depends on the particular frame format and on the fields being used to hold the forward sequence and offset value. The second field 204 includes a plurality of nibbles 206-1, 206-2, 206-3, 206-N (generally, 206). Each nibble 206 stores a port number. The order of the nibbles 206 defines the forwarding sequence (i.e., the sequence of port numbers). Here the forwarding sequence is port number 2, followed by port number 3, followed by port number 1 (i.e., "0010" in nibble 206-1, "0011" in nibble 206-2, and "0001" in nibble 206-3). Using the offset value and forwarding sequence of FIG. 5A as an illustrative example, the switch device 52 extracts port number 2 from the first nibble 206-1, because the offset value is 1. Although nibbles are described herein for holding port numbers, fewer or more bits than 4 bits can be used to represent a port number.

In an alternative embodiment, the switch device 52 can be configured to extract, by default, the port number from the first nibble 206-1 of the second field 204 for any frames arriving from the initiating system through the port 54-1. For such an embodiment, the initiating system 56 does not need to store the offset value in the field 204 of the frame.

Figure 5B:
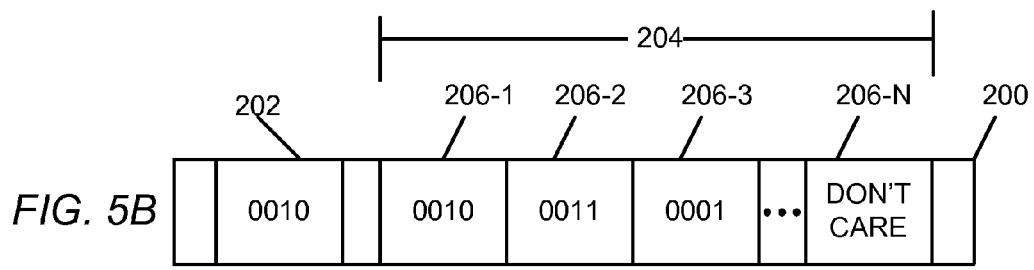

Before the switch device 52 forwards the frame to the port corresponding to the port number extracted from the first nibble 206-1 of the field 204, the switch device 52 increments (step 158) the offset value in the field 202. The forwarding sequence stored in the second field remains unchanged. FIG. 5B shows the offset value in field 202 as equal to 2. Then the switch device 52 sends (step 160) the frame to the second computing system 60, which has a physical link 62 to port 2 (for the purposes of this example, port number 1 corresponds to port 54-1, port number 2 corresponds to port 54-2, and port number 3 corresponds to port number 54-N).

Figure 5C:
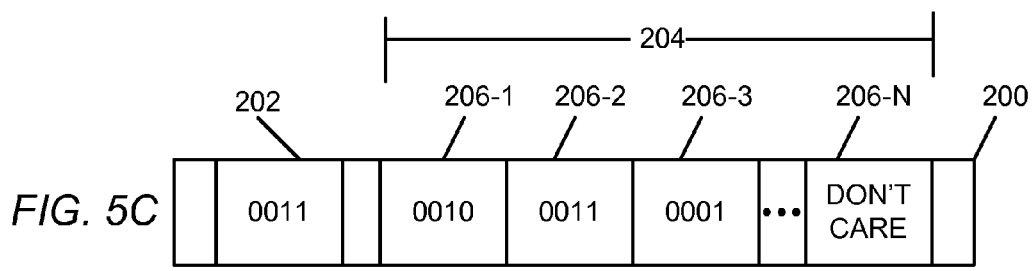

If, at step 162, the frame returns from the computing system, which is what occurs in this example, the switch device 52 again extracts (step 154) the offset value stored in the first field 202 and acquires (step 156) the next port from the second field 204. Now, the current offset value in the field 202 is equal to 2, directing the switch device 52 to extract the port number from the second nibble 206-2 of the field 204. The extracted port number is equal to 3. After incrementing the offset value (step 158), as shown in FIG. 5C, the switch device 52 sends (step 160) the frame to the computing system 64 physically linked to port number 3 (i.e., port 54-N).

If the frame returns from the computing system (step 162), the switch device 52 extracts the port number from the third nibble 206-3 because the offset value is now equal to 3. The port number in the third nibble 206-3 is equal to 1, which causes the switch device 52 to forward the frame through port number 1 (i.e., port 54-1). The initiating system 56 is physically linked to port number 1, and consequently receives the frame from the switch device. Thus, multiple computing systems have sequentially handled (processed) the frame before the frame returns to the initiating system. As noted previously, the frame need not eventually return to the initiating system.

Figure 6:
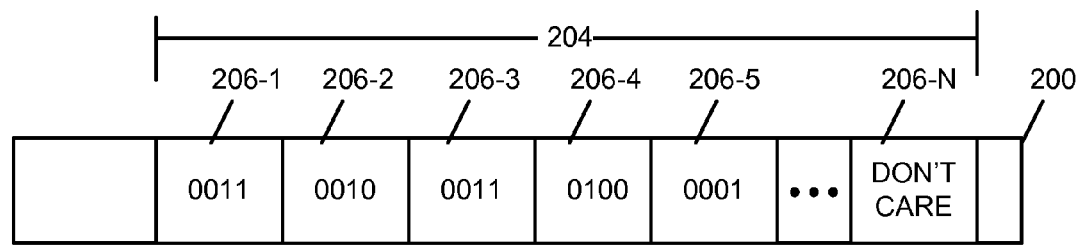
FIG. 6 is a diagram of a field within a frame containing an example of a port number sequence.

The length of a forwarding sequence can vary, depending upon the number of other computing systems that are to participate in the sequential processing of the frame and the number of times each of such other computing systems appears in that forwarding sequence. For example, FIG. 6 shows another example of a forwarding sequence as stored, for example, in a source MAC address field. This forwarding sequence causes the switch device to send the frame out sequentially through port number 3, port number 2, port number 3 again, and port number 4 (provided the computing systems connected to such ports return the frame to the switch device) before returning the frame to the initiating system through port number 1. The use of port number 1 for connecting to the initiating system is arbitrary; the initiating system can be connected to any of the ports of the switch device.

Figure 7:
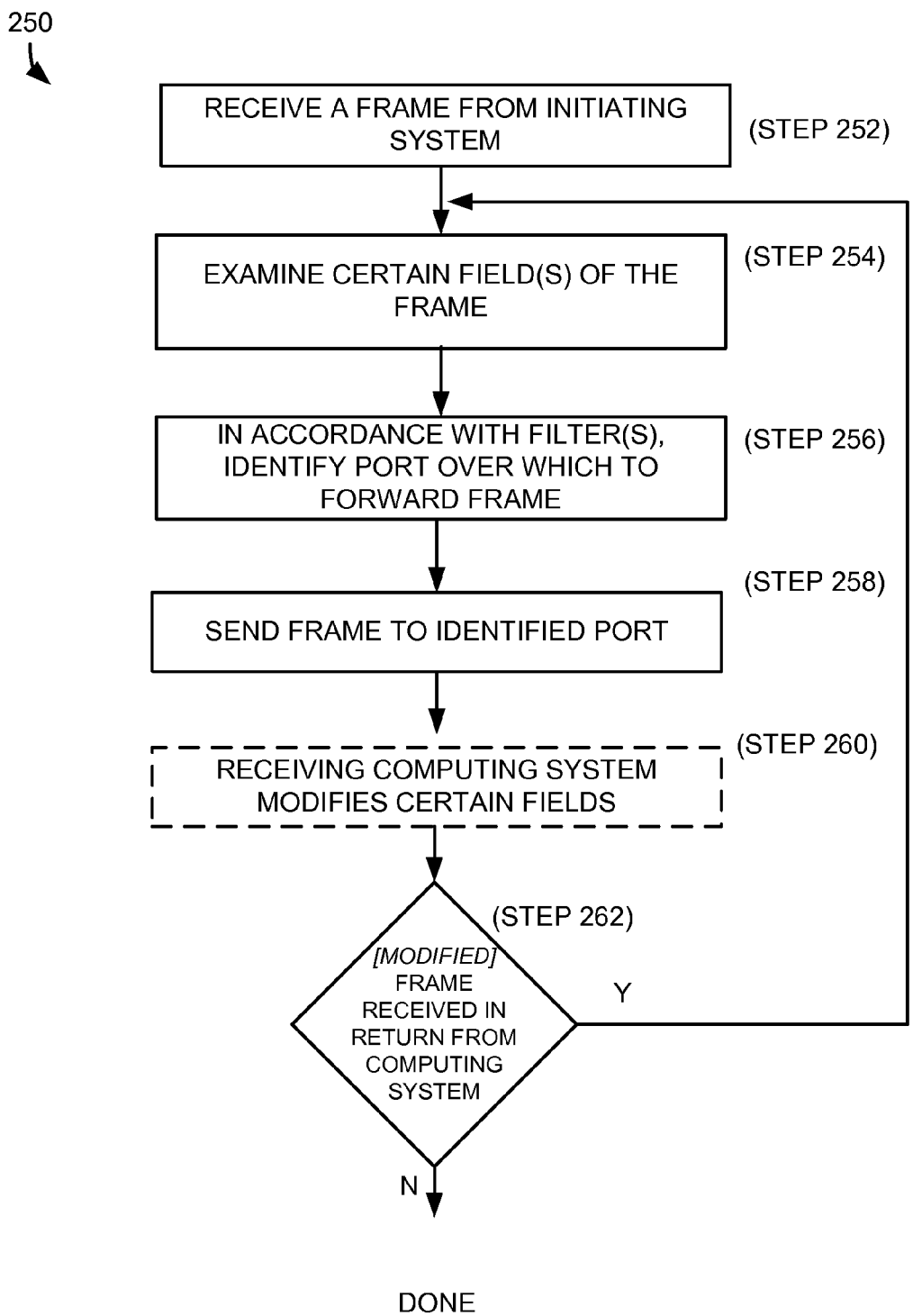
FIG. 7 is a flow diagram of another embodiment of process for identifying ports through which to forward frames.

FIG. 7 shows an embodiment of another process 250 for forwarding a received frame. In this embodiment, the initiating system 56 does not need to include a forwarding sequence within the frame. Instead, the switch device uses various filters to identify the next port based on information carried by the frame, as described below. In addition, in this embodiment the frame does not need to carry an offset value, although the use of a count to track the number of times the frame enters the switch device may in some embodiments be used, in conjunction with the filters, to identify the next port. Many different filters can be designed to identify a next port in a forwarding sequence.

As an illustrative example, a frame arrives (step 252) at the switch device 52 from the initiating system 56. The switch device 52 extracts (step 254) information from one or more specific fields of the frame header. For example, the specific fields can be a source IP address field and a destination IP address field. A particular filter running on the switch device correlates (step 256) the information acquired from these fields to a particular egress port. As a simple example, the switch device can use either or both IP addresses to produce an index into a look-up table (e.g., table 69 of FIG. 2) that correlates IP addresses to ports. As another example, the identity of the ingress port can be used in combination with one or both IP addresses when indexing into the look-up table. As yet another example, the filter can perform a hash on these IP addresses to derive a hash value, and then uses the hash value as an index into a hash table (e.g., table 69 of FIG. 2) that supplies the identity of the egress port based on the hash value. As still another example, a frame arrives (step 252) at the switch device 52 from the initiating system 56 on port 54-1. In accordance with policy, the switch device 52 inserts an outer VLAN tag into the frame, with a predefined value being used as a port identifier in the VLAN ID field. This port identifier can then be propagated to a computing system which can modify the value in the VLAN ID (instead of an IP address) before returning the frame to the switch device. The frame returning to the switch device from the computing system has the port configured to filter on the VLAN ID, to match on this port identifier, and to redirect the frame to an egress port associated with the port identifier value in the VLAN ID, thus permitting the computing system to influence the forwarding path on the switch device 52. In accordance with policy, the switch device 52 can be configured to remove the VLAN tag on the egress port. These examples are not exhaustive, there being no known limit to the number and types of filters that can be designed for identifying the next port in a forwarding sequence based on an incoming frame.

After identifying the egress port, the switch device redirects (step 258) the frame to the computing system connected to that port. The computing system that receives the frame can modify (step 260) one or more fields in the frame that are used by the switch device to identify an egress port (e.g., the addresses within the source and destination IP address fields) before returning the frame to the switch device. By modifying the field(s), the computing system can thus affect the frame-forwarding behavior of the switch device.

When the switch device receives the frame (step 262), modified or unchanged, the switch device repeats the process of extracting information from certain fields of the frame (which may or may not be different from the fields examined when the frame arrived originally from the initiating system), running a filter to identify the next port, and redirecting the frame to the computing system connected to that port. Eventually, the frame may be returned to the initiating system, depending upon the operation of the filters.

Switch Device to Server Interface: VLAN Tag

The switch device and servers can use one or more of the fields of the frame header to communicate with each other and thus affect their frame forwarding and processing behavior. The switch device and each of the servers can insert and modify the value in the field. The particular value in the field, in effect, informs the frame's recipient to take certain action. In one embodiment, one field used to implement this communication interface is the VLAN tag (also known in an Ethernet frame as the 801.1Q header).

Figure 8:
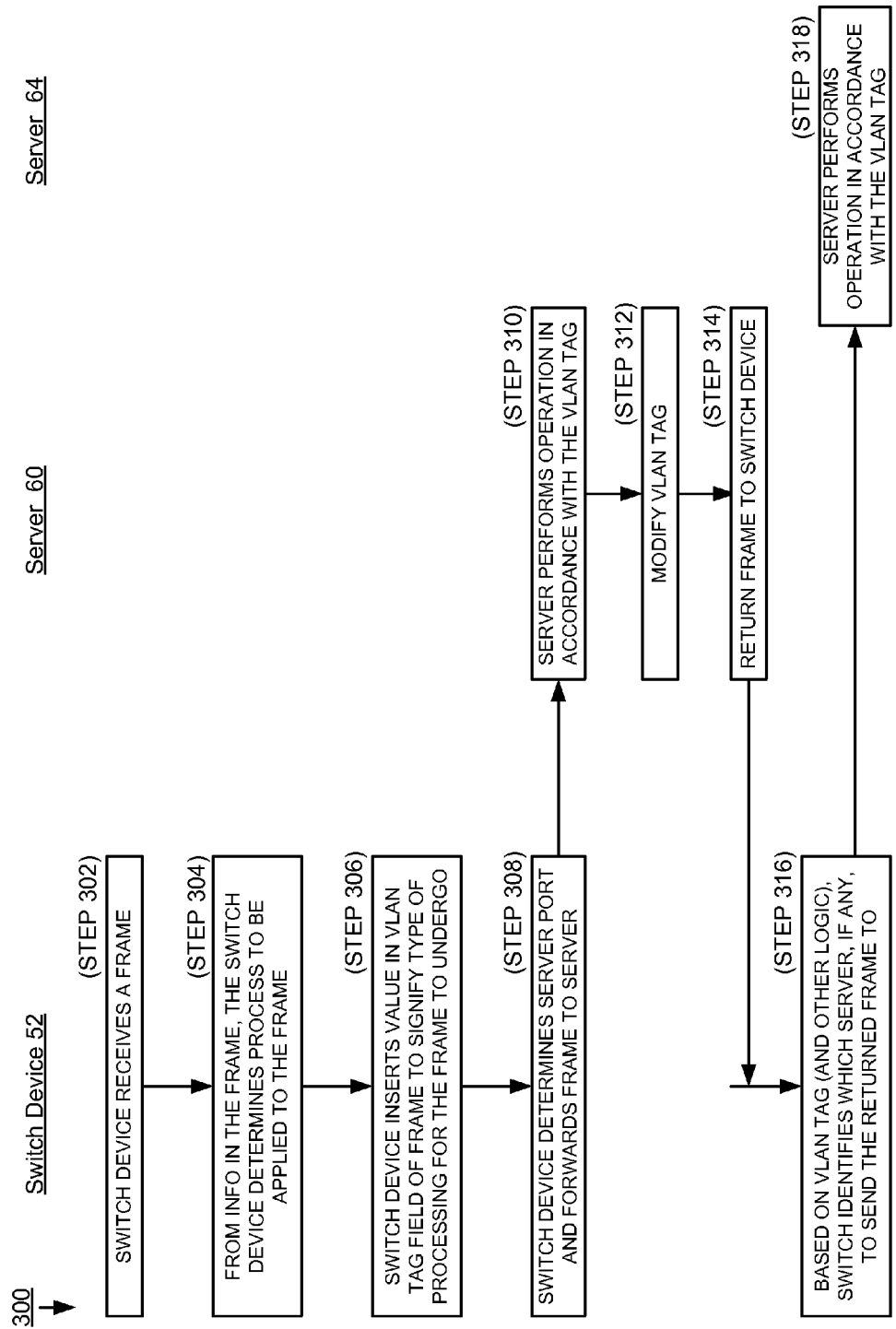
FIG. 8 is a flow diagram of an embodiment of process for using a field of a frame header to control frame processing and frame forwarding among the switch device and computing systems (e.g., servers).

FIG. 8 shows an embodiment of a process 300 by which the switch device 52 and computing systems (here, referred to for example as servers) use the communication interface to guide frame forwarding and processing. In this description of the process 300, reference is also made to the various components of FIG. 2. In brief overview, the switch device 52 and servers each brings its particular strengths to the performance of the process 300. In its frame-switching capacity, the switch device 52 has capabilities superior to those of the servers when processing frame headers and directing frames to appropriate ports.

In contrast, each server has a more processing power and memory than the switch device, and, therefore, is able to perform deep frame inspection based on the frame header in addition to inspection of the other contents of the frame. Each server can also store in its memory information about the frame and compare that information with that about other frames. The processing power and memory also enable a server to gather statistics about frame processing and redirection, which enables the generation of efficient routing policies.

Use of a common process identifier (i.e., opcode, for example, VLAN ID tag) further enables the switch device and servers to communicate with each other, and thus influence each other's performance. The combined effect is an acceleration of overall network performance; the switch device processes packets at or approaching line rates, using the process identifier to signify to each recipient server a process to perform on the frames, while the servers perform deep analyses of the frames, and modify the process identifier in the frames so as to influence the frame forwarding behavior of the switch device when the frames are returned.

At step 302, the switch device 52 receives a frame, for example, from a client system. From information in the header of the frame, the switch device determines (step 304) how the frame is to be processed. For example, the switch device can determine from a field in the frame header that the frame is to be handled with priority. As other examples, the switch device can determine from the frame header that the frame is to be sent to a firewall server, to an encryption or decryption server, to a transcoder server, or to a virus protection server.

In response to its determination, the switch device inserts (step 306) a value into the VLAN tag field (for example) in the header of the frame. A policy governing the logic of the switch device determines the particular value inserted. As used herein, a policy sets forth one or more courses of action to be taken for certain types of traffic. This value corresponds to an opcode understood by the switch device and by the servers to signify that the frame is to undergo certain processing. Through this opcode, the switch device in effect communicates the policy (i.e., course of action) to be undertaken by a recipient server. Specific bits of the VLAN tag can be reserved specifically to carry the opcode (e.g., 4 bits of the second byte of the 4-byte VLAN tag).

In addition, the switch device identifies (step 308), for example, a server port to which to forward the frame (e.g., by applying a filter to one or more select field(s) in the frame header) and sends the frame to a particular server (e.g., computing system 60) through that server port. In other examples, the switch device can identify a group of ports, a trunking port, or an application group.

In response to the particular opcode in the VLAN tag, the recipient server undertakes (step 310) a certain action (governed by the logic of the recipient server and, generally, in response to the policy communicated by the opcode). The logic of the recipient server can then determine that the frame requires additional processing of the same or of a different type at another server, and communicates the need for this additional processing to the switch device through the VLAN tag. For example, the recipient server can determine that it is presently overloaded and unable to process the frame; accordingly, the server uses the VLAN tag to communicate this condition to the switch device.

To achieve this communication, the recipient server modifies (step 312) the value in the VLAN tag (i.e., it changes the opcode) and returns (step 314) the frame to the switch device. For example, the server can use a particular value known system-wide to signify an overload condition. The recipient server may also modify the one or more fields used by the switch device to find the next port. The switch device knows the new opcode to mean that the frame requires processing (as indicated by the recipient server), and the logic of the switch device responds to the opcode accordingly such that the processing can take place. For example, based on modified opcode in the VLAN tag and logic for processing frames having this opcode, the switch device can redirect (step 316) the frame to another server (e.g., computing system 64) for the prescribed processing.

Thus, by this modification of the VLAN tag, the first recipient server is able to manipulate the frame-forwarding behavior of the switch device. Before redirecting the frame to the other server, the switch device can also modify the opcode in the VLAN tag, as a means by which to inform the other server 64 of the processing expected to be performed upon the arriving frame. This other server, in response to the opcode in the VLAN tag, performs the associated action. After performing the action, the other server 64 may perform one or more additional actions as part of processing the frame, including modifying the VLAN tag in the frame, modifying one or more other frame header fields, and either returning the frame to the switch device 52 or forwarding the frame to another switch device, as described below.

Consider, as an example illustrating the process 300, that the switch device 52 inserts an opcode value of FF (e.g., for an 8-bit implementation of an opcode) into the VLAN tag in the frame header to signify to a recipient server that the frame corresponds to a secure transaction. When the recipient server 60 reads the VLAN tag and determines from the opcode that the frame corresponds to secure transaction, the logic of the recipient server performs one or more specific actions, for example, scanning the frame for viruses. The recipient server then returns the frame to the switch device.

Before returning the frame to the switch device, the server can modify the opcode in the VLAN tag to a new value that signifies the frame requires priority handling, for example, if deemed virus-free. (Or, for example, if the server detects a virus, the new value can signify to the switch device that the frame is to be dropped). In addition to changing the VLAN tag value, the server can also modify certain fields in the frame header that resolve to identify one such priority-handling server (when hashed or examined by the switch device).

When the switch device examines the VLAN tag, its policy-based logic can respond to the new opcode therein to cause the switch device to use a table with entries that map values to ports connected to priority-traffic-handling servers in order to identify the next port. As examples of alternative policy-based responses to the new opcode in the VLAN tag, the switch device can instead drop the frame, or send the frame to a group of ports, to a trunk, or to an application group. Hence, as directed by its policy (i.e., logic), the switch device redirects the frame. Before redirecting the frame, the switch device can also modify the opcode in the VLAN tag, as a means by which to inform its destination, for example, a priority-traffic-handling server, of the type of processing to be performed on the frame.

In one embodiment, the meaning of the opcode carried by VLAN tag has local scope; that is, only the switch device and the servers to which the switch device is connected through ports 54 (FIG. 2) understand the meaning of certain opcode values, and these opcode values have no meaning beyond this local scope (e.g., in another rack or chassis comprised of a switch device and blade servers, or external to the data center). In this embodiment, the opcode in the VLAN tag in the frame is cleared before the frame leaves this local scope, for example, the frame returns to an initiating system or is forwarded to another rack or chassis in the data center or to the Internet over an uplink.

In other embodiments, the meaning of certain opcodes is known data-center wide; that is, the switch devices and servers in each of the racks or chasses in the data center understand the meaning of certain opcode values, but these opcode values have no meaning beyond data center. In this embodiment, a server in given rack or chassis does not clear the opcode in the VLAN tag when the destination of the frame is another server in the data center. The VLAN tag becomes cleared when the frame is forwarded outside of the data center.

Embodiments of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. In a data center with a switch device in communication with a plurality of servers, a method of processing an Ethernet frame comprising:
   determining, by the switch device, from content in a header of the Ethernet frame received from an initiating system by the switch device, a first of a plurality of ports of the switch device through which to forward the frame to a first server of the plurality of servers;
   inserting, by the switch device, a value into a VLAN (virtual Local Area Network) tag in the header of the frame before forwarding the frame, said value representing one or more policies to govern the processing of the frame by the first server;
   forwarding, by the switch device, the frame to the first server;
   performing, by the first server, a specific action related to processing the frame based on the value inserted into the VLAN tag;
   modifying, by the first server, the value in the VLAN tag of the header of the frame before returning the frame to the switch device;
   returning the frame, with the VLAN tag modified by the first server, to the switch device; and
   forwarding, in response to the switch device receiving the modified VLAN tag from the first server, the frame from the switch device to a second server of the plurality of servers without first returning the frame to the initiating system.

2. The method of claim 1, wherein the switch device determines the first port through which to forward the frame by:
   generating the value based on content in the header of the frame;
   accessing a table entry in a table within the switch device using the generated value as an index into the table, wherein table entries map values to the plurality of ports; and
   identifying the first port through which to forward the frame in response to the accessed table entry, wherein said one or more policies comprises examining the frame by an intrusion protection system of the first server.

3. The method of claim 1, wherein said one or more policies comprises examining the frame by a firewall of the first server.

4. The method of claim 1, wherein said one or more policies further comprises filters to identify a second port of the plurality of ports for forwarding the frame to the second server.

5. The method of claim 4, further comprising modifying, by the switch device, a current value in the VLAN tag of the header of the frame before redirecting the frame to the second server.

6. The method of claim 1, wherein the specific action performed by the first server comprises modifying said value in the VLAN tag to signify priority handling to the switch device if the frame is determined to be virus-free, and dropping the frame if a virus is detected in the frame.

7. The method of claim 1, further comprising the first server: determining the frame requires processing at a different server of the plurality of servers; modifying the value in the VLAN tag of the header of the frame to indicate the frame requires processing at a different server of the plurality of servers; and returning the frame to the switch device.

8. A blade server rack, comprising:
a plurality of servers; and
a switch device having a plurality of ports, the switch device being physically connected to a first of the plurality of servers through a first of the plurality of ports and to a second of the plurality of servers through a second of the plurality of ports, the switch device further comprising a frame forwarder with logic configured to switch frames between the plurality of ports, and a frame processor with logic configured to determine, from content in a header of a received Ethernet frame from an initiating system, the first of the plurality of ports through which to forward the frame to a first of the plurality of servers, the frame processor further comprising logic configured to insert a value into a VLAN (virtual Local Area Network) tag of the header of the frame before the frame forwarder forwards the frame through the first of the plurality of ports determined for forwarding the frame, the value inserted into the VLAN tag communicating a policy for processing the frame to the first of the plurality of servers,
wherein the first of the plurality of servers includes logic configured to modify the value in the VLAN tag of the header of the frame before returning the frame to the switch device, and the frame processor further includes logic configured to perform a specific action based on the modified value when the frame returns to the switch device from the first of the plurality of servers, said modified value signifying the first server is unable to process the frame and the frame requires processing at a different server of the plurality of servers.

9. The blade server rack of claim 8, wherein the switch device further comprises a table with entries mapping values to the plurality of ports, and wherein the frame processor further includes logic configured to determine the first of the plurality of ports through which to forward the frame by:
generating the value based on content in the header of the frame;
accessing a table entry in the table using the generated value as an index into the table; and
identifying the first of the plurality of ports through which to forward the frame from the accessed table entry, and wherein said policy further comprises examining the frame by an intrusion protection system of the receiving computing system.

10. The blade server rack of claim 8, wherein said policy provides the frame will be examined by a firewall of the first server.

11. The blade server rack of claim 8, wherein the modified value further signifies the first of the plurality of servers is overloaded and the specific action performed by the switch device includes redirecting the frame to the second of the plurality of servers without first returning the frame to the initiating system.

12. The blade server rack of claim 11, wherein the frame processor further includes logic configured to modify the current value in the VLAN tag of the header of the frame before redirecting the frame to the second of the plurality of servers, said policy further providing a filter for identifying a forwarding sequence of the frame.

13. The blade server rack of claim 8, further comprising modifying, by the switch device, the value in the VLAN tag of the header of the frame before forwarding the frame to the second of the plurality of servers.

14. A data center, comprising:
a plurality of blade server racks, each blade server rack including a plurality of servers and a switch device having a plurality of ports, the switch device being physically connected to a first of the plurality of servers of the blade server rack through a first of the plurality of ports and to a second of the plurality of servers of the blade server rack through a second of the plurality of ports, each switch device further comprising:
a frame forwarder with logic configured to switch a frame received from an initiating system between the plurality of ports of the switch device for forwarding; and
a frame processor with logic configured to determine from content in a header of the frame one of the plurality of ports of the switch device through which to forward the frame, the frame processor further comprising logic configured to insert a value into a VLAN (virtual Local Area Network) tag of the header of the frame before the frame forwarder forwards the frame, the value inserted into the VLAN tag of the header communicating to a recipient device of the frame a policy for processing the frame, said policy providing the frame will be examined by a firewall of a receiving computing system,
wherein each of the plurality of servers includes logic configured to modify the value in the VLAN (virtual Local Area Network) tag of the header of the frame before returning the frame to the switch device, and the frame processor of the switch device further includes logic configured to perform a specific action based on a current value in the VLAN tag of the header of the frame when the frame returns wherein the specific action comprises forwarding the frame to another different recipient device without first returning the frame to the initiating system.

15. The data center of claim 14, wherein each switch device further comprises a table with entries mapping values to the plurality of ports of the switch device, and wherein the frame processor of the switch device further includes logic configured to determine the first port of the switch device through which to forward the frame by:
generating the value based on content in the header of the frame;
accessing a table entry in the table of the switch device using the generated value as an index into the table of the switch device; and identifying the first port of the switch device through which to forward the frame from the accessed table entry, and wherein said policy further comprises examining the frame by an intrusion protection system of the receiving computing system.

16. The data center of claim 14, wherein said policy provides the frame will be examined by a firewall of the receiving computing system.

17. The data center of claim 14, wherein the value in the VLAN tag of the header of the frame is cleared before the frame is forwarded.

18. The data center of claim 14, wherein the specific action further comprises priority handling by the switch device if the modified value of the frame indicates the frame is virus-free, and dropping the frame if the modified value of the frame indicates a virus is detected in the frame.

* * * * *